(12) United States Patent
Cantrell et al.

(10) Patent No.: US 7,350,826 B2
(45) Date of Patent: Apr. 1, 2008

(54) CONDUIT ASSEMBLY

(75) Inventors: Christopher Thomas Cantrell, Toccoa, GA (US); Lee Andrew Fausneaucht, Jackson, MI (US)

(73) Assignee: Eaton Corporation, Cleveland, OH (US)

( * ) Notice: Subject to any disclaimer, the term of this patent is extended or adjusted under 35 U.S.C. 154(b) by 218 days.

(21) Appl. No.: 11/013,183

(22) Filed: Dec. 15, 2004

(65) Prior Publication Data

US 2006/0125233 A1   Jun. 15, 2006

(51) Int. Cl.
*F16L 33/00* (2006.01)
(52) U.S. Cl. .................. 285/222.1; 285/903; 285/256; 138/121; 138/137
(58) Field of Classification Search ............. 285/222.4, 285/903, 242, 256, 149.1, 222.1; 138/121, 138/122, 126, 124, 137, 141, 125
See application file for complete search history.

(56) References Cited

U.S. PATENT DOCUMENTS

| | | | |
|---|---|---|---|
| 5,209,267 A | * | 5/1993 | Morin ........................ 138/109 |
| 5,365,984 A | * | 11/1994 | Simpson et al. ............. 141/387 |
| 6,321,794 B1 | * | 11/2001 | Ishida et al. ................. 138/121 |
| 6,576,312 B1 | * | 6/2003 | Ito et al. .................. 428/36.91 |
| 6,682,796 B2 | * | 1/2004 | Ito et al. .................. 428/36.91 |
| 6,755,217 B1 | * | 6/2004 | Yoshida et al. ............. 138/121 |
| 6,935,378 B2 | * | 8/2005 | Ikemoto et al. ............. 138/121 |

* cited by examiner

*Primary Examiner*—David Bochna
(74) *Attorney, Agent, or Firm*—Benesch, Friedlander, Coplan & Aronoff LLP

(57) ABSTRACT

A conduit assembly, such as an electrical conduit assembly, includes a flexible convoluted tube having a non-conductive fluoropolymer interior and a conductive carbon exterior that decreases the electrical resistance of the tube. A fitting is secured to an end of the flexible convoluted tube. The fitting includes a nipple having a profiled tubular portion received into the end of the flexible convoluted tube and a socket secured to the fitting so as trap the end of the flexible convoluted tube between the nipple and the socket. At least one of the nipple and the socket are made from a metal treated to decrease the electrical resistance of the fitting.

19 Claims, 3 Drawing Sheets

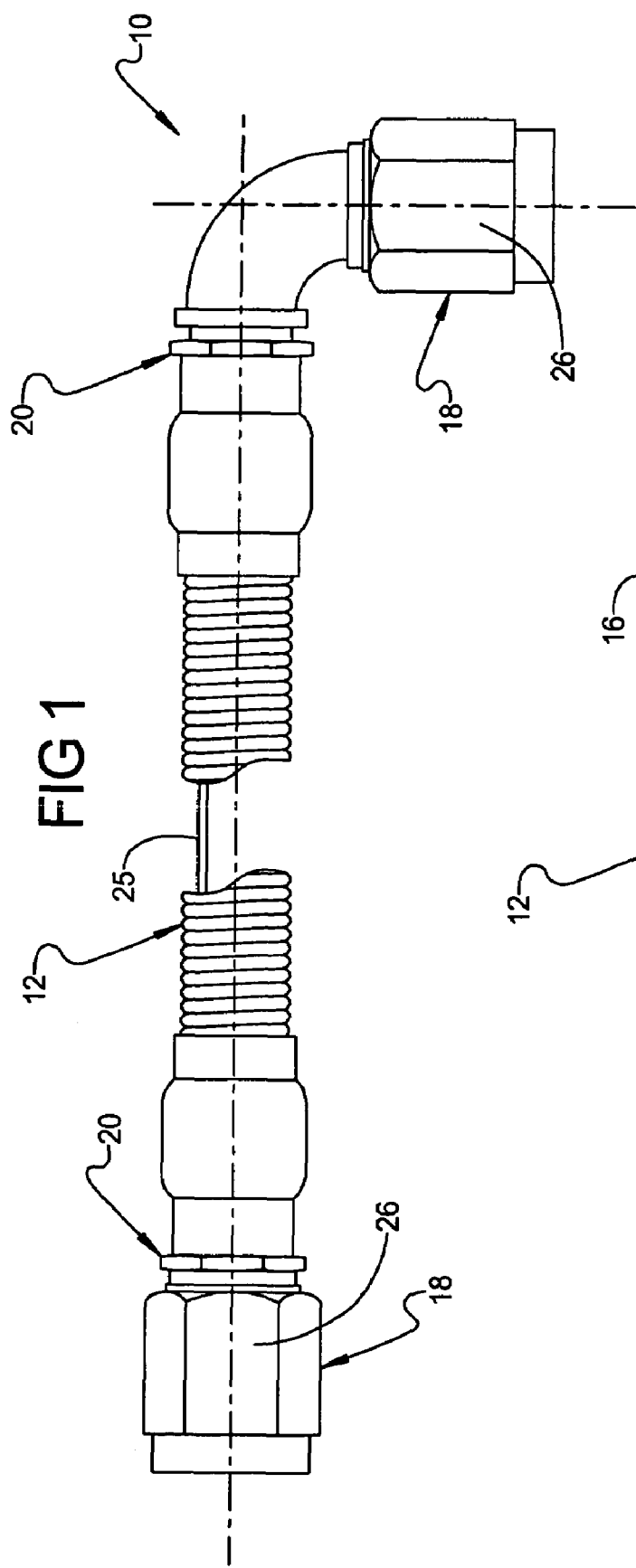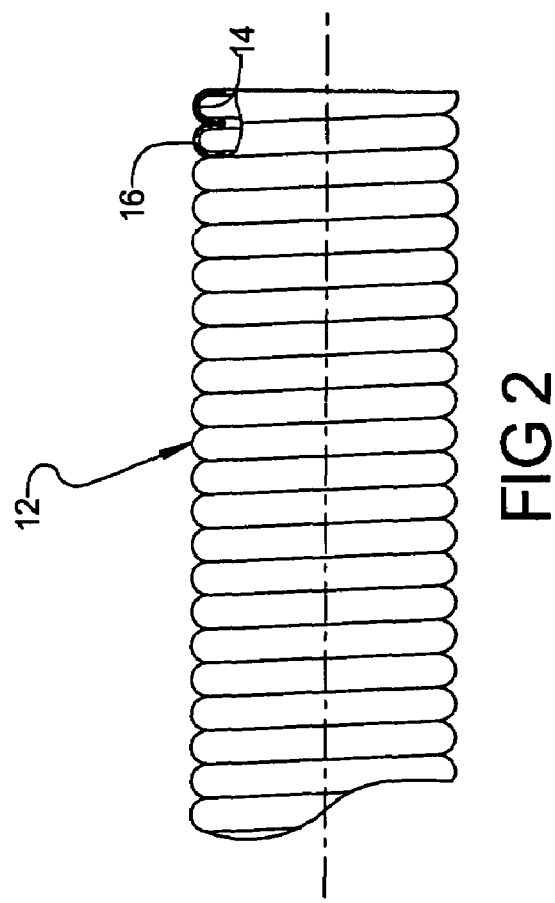

CONDUIT ASSEMBLY

FIELD OF THE INVENTION

The present invention relates generally to conduit assemblies and, more particularly, to a flexible conduit assembly suitable for routing electrical wires through aviation fuel systems.

BACKGROUND OF THE INVENTION

In May 2001, the Federal Aviation Administration released a comprehensive Special Federal Aviation Regulation (SFAR No. 88) requiring all airframe manufacturers and Supplemental Type Certificate (STC) holders to conduct a safety review of fuel system components. Included in the regulation were requirements to prepare special maintenance inspections that operators of transport aircraft would use to determine the continued safety and airworthiness of the fuel system on their respective aircraft. Since the release of SFAR No. 88 in May of 2001, aviation fuel system manufacturers have embarked on a comprehensive effort to address the fuel system safety requirements specified in the regulation.

Among other requirements, SFAR No. 88 states that no ignition source may be present in an aircraft fuel tank system where catastrophic failure could occur due to ignition of fuel or vapors. In pre-SFAR No. 88 fuel tank designs, electrical wires were routed through a fuel system in hard-plumbed metal conduits that separated the wires from the aviation fuel. Among other limitations, hard-plumbed metal conduits are relatively inflexible, which increases the complexity of the routing and the difficulty of manufacture. Another limitation of metal conduits is their inability to isolate electrical wires when the sleeving and insulation on the wires is worn or damaged. Worn electrical wires may arc through the conductive metal components of the conduits and into the fuel tank ullages creating a risk of fire. Since current metal conduits fail to satisfy the safety requirements of SFAR No. 88, a need exists for a relatively flexible conduit assembly that electrically isolates a worn or damaged electrical wire within the conduit from the flammable contents of a fuel tank.

SUMMARY OF THE INVENTION

In an embodiment of the present invention, a conduit assembly is provided that includes a flexible convoluted tube having a non-conductive fluoropolymer interior and a conductive carbon exterior that decreases the electrical resistance of the tube. A fitting is secured to an end of the flexible convoluted tube. The fitting includes a nipple having a tubular portion received into the end of the flexible convoluted tube and a socket secured to the fitting so as trap the end of the flexible convoluted tube between the nipple and the socket. At least one of the nipple and the socket are made from a metal treated to decrease the electrical resistance of the fitting. An electrical conduit assembly adapted to be installed in a fuel tank is also provided.

Other aspects of the invention will be apparent to those skilled in the art after review of the drawings and detail description provided below.

BRIEF DESCRIPTION OF THE DRAWINGS

The present invention will now be described, by way of example, with reference to the accompanying drawings, in which:

FIG. 1 is an elevation view of a conduit assembly according to an embodiment of the present invention;

FIG. 2 is a partial-cross sectional view of a flexible corrugated tube according to an embodiment of the present invention;

DETAILED DESCRIPTION OF THE INVENTION

Figure 3:
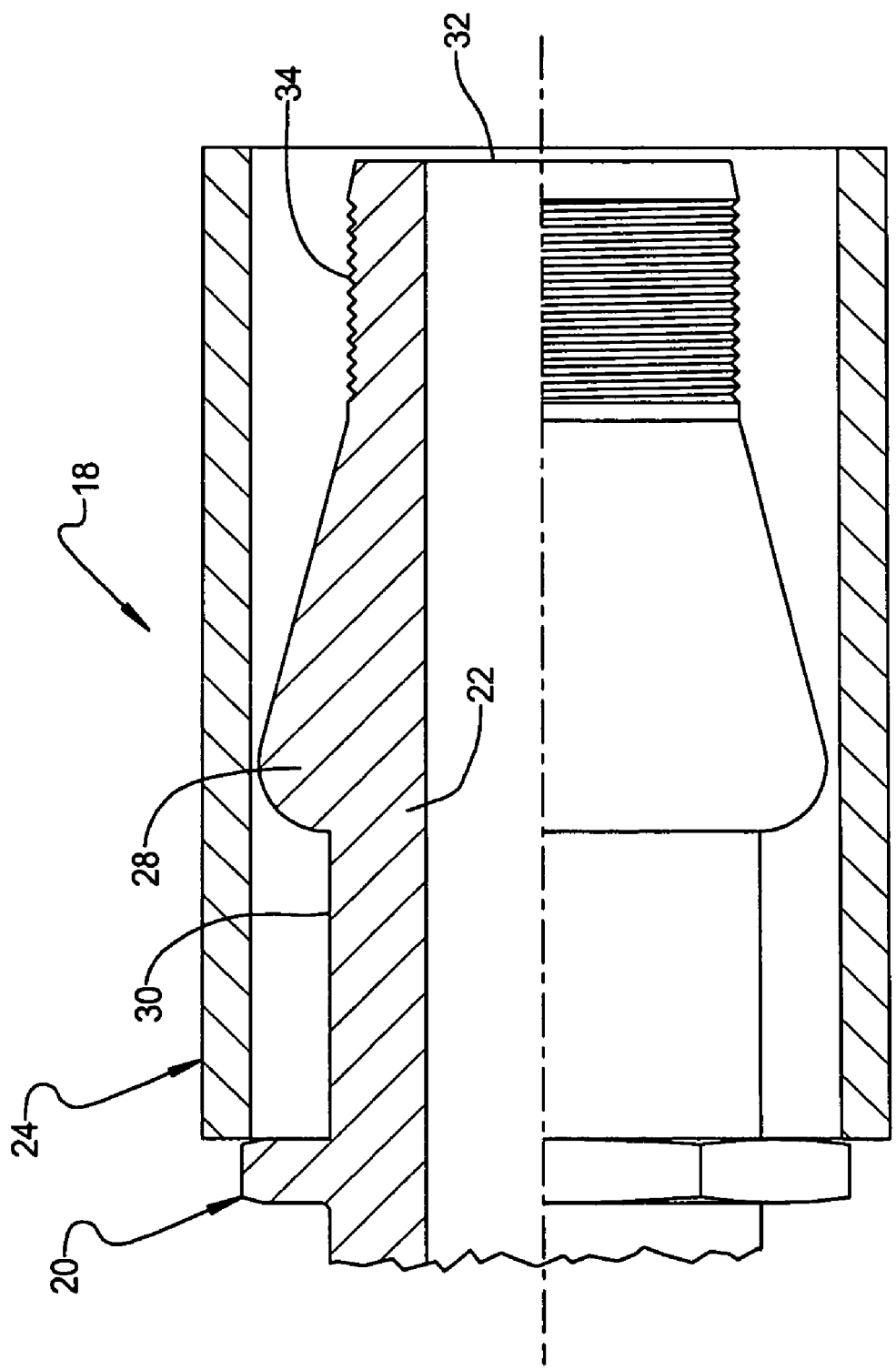
FIG. 3 is a cross-sectional view of a fitting according to an embodiment of the present invention, showing a nipple and a socket prior to attachment to a flexible corrugated tube.

FIGS. 1-4 illustrate a conduit assembly according to an embodiment of the present invention. In the illustrated embodiment, conduit assembly 10 includes a flexible convoluted tube 12 having a non-conductive polymeric interior 14 and a conductive exterior 16 that decreases the electrical resistance of the tube 12. A fitting 18 is secured to each end of the flexible convoluted tube 12 and includes a nipple 20 having a tubular portion 22 received into an end of the flexible convoluted tube 12 and a socket 24 secured to the nipple 20 so as trap the end of the flexible convoluted tube 12 between the nipple 20 and the socket 24. When conduit assembly 10 functions as an electrical conduit assembly, as shown in FIG. 1, at least one electrical wire 25, such as an insulated power or communication wire, extends through a bore of the flexible convoluted tube 12.

While fitting 18 is shown in the illustrated embodiment with a threaded female adapter 26 configured to mate with a threaded connector (not shown), fitting 18 is not limited thereto and may include other adapter configurations, quick connect/disconnect couplings and even no connecting interface at all. As shown in FIG. 1, fitting 18 may be configured with a straight adapter or an elbow-style adapter. Furthermore, fitting 18 is not limited to a specific size and can cover a wide range of both conventional and unconventional sizes.

Referring to FIG. 2, a partial cross-sectional view of the flexible convoluted tube 12 is shown. In the illustrated embodiment, the non-conductive polymeric interior is a fluoropolymer, such as plastic or rubber, or other material that exhibits chemical and temperature resistance to relatively caustic or extreme temperature environments. Fluoropolymers suitable for use in tube 12 include, without limitation, PTFE, FEP, PFA, ETFE, ECTFE, MFA, PVDF or THV; however, the type of fluoropolymer used in tube 12 will depend on the temperature and chemical compatibility of tube 12 with the environment into which conduit assembly 10 is installed. For example, when conduit assembly 10 is installed in an aviation fuel system and exposed to hydrocarbon aviations fuels, such as Jet A, the non-conductive fluoropolymer interior of tube 12 may be made from PTFE. Fluoropolymer materials having an operating temperature in a range from about −65° F. (−53° C.) to about +400° F. (+204° C.) are particularly suited for use in aviation fuel systems.

The high resistivity of some fluoropolymers, particularly plastic fluoropolymers, may result in static charge build-up on the fluoropolymer that can generate a spark. To facilitate the dissipative elimination of static charges on the fluoropolymer, a static dissipative or conductive material 16 is applied to the non-conductive exterior of tube 12. In an embodiment, the static dissipative or conductive material 16 is a carbon black that is applied to the non-conductive polymeric material. It will be appreciated that static dissipative or conductive materials other than carbon black may also be applied to the exterior of tube 12 to dissipate static or electrical charges. The conductive material 16 may be applied to the polymeric material 14 using a variety of techniques, including without limitation, co-extrusion, vapor deposition and spray coating. In an embodiment, the outer surface of the polymeric material 14 is impregnated with the conductive material 16 to form a suitable bond therebetween.

In a particular embodiment of the invention, the electrical resistance of the tube 12 exterior is generally equal to or less than approximately 50 Meg-Ohms when measured from end to end. Accordingly, when tube 12 is installed in the conduit assembly 10 illustrated in FIG. 1, the electrical resistance of conduit assembly 10 is generally equal to or greater than 50 Meg-Ohms with a potential of 1000 volts DC, when measured from end to end of the conduit assembly with one test probe located on the outside surface of the elbow adapter and another test probe located on the straight adapter.

Referring to FIG. 3, a cross-sectional view of fitting 18 is shown prior to securing fitting 18 to tube 12. In an embodiment, nipple 20 is made from aluminum that is hard-coat anodized according to Military Specification MIL-A-8625 and socket 24 is made from stainless steel that is passivated pursuant to the Society of Automotive Engineers AMS-QQ-P-35 standard. It will also be appreciated that the materials used in nipple 20 and socket 24 are not necessarily limited thereto, provided that the conduit assembly 10 satisfies the electrical resistivity requirements of a given installation.

In the embodiment of fitting 18 shown in FIG. 3, the tubular portion 22 of nipple 20 includes a rib 28 that protrudes from an outer surface 30. Between rib 28 and a distal end 32 of tubular portion 22 is a profiled surface 34 that includes at least one tube retaining feature, such as a peak or valley. In the illustrated embodiment, profiled surface 34 includes a number of peaks and valleys that grip tube 12 when it is compressed against profiled surface 34.

Figure 4:
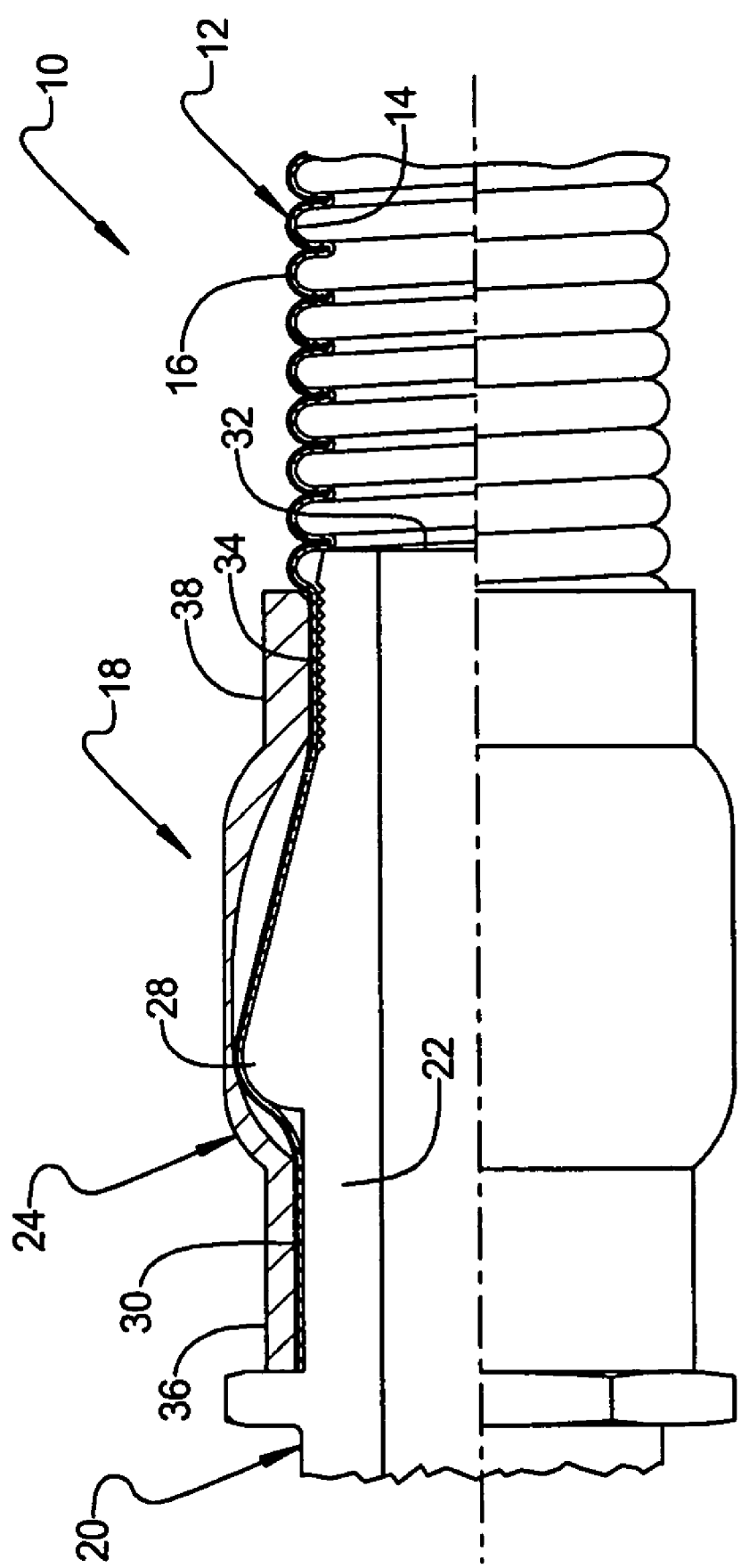
FIG. 4 is a detailed cross-sectional view of the conduit assembly of FIG. 1, showing the interface between a flexible convoluted tube and a fitting after reduction in diameter of the socket.

During assembly of conduit 10, nipple 20 is inserted into tube 12 with socket 24 covering the end of tube 12 into which nipple 20 is inserted. A portion of the socket diameter on either side of rib 28 is then reduced using a crimping or swaging technique known in the art, such that tube 12 is trapped between nipple 20 and socket 24 as shown in FIG. 4. A first reduced portion 36 of socket 24 retains the socket 24 on nipple 20 by virtue of its smaller diameter relative to the diameter of rib 28. A second reduced portion 38 of socket 24 compresses tube 12 against profiled surface 34 to grip and prevent tube 12 from being separated from fitting 18 and to provide a seal between fitting 18 and tube 12.

As will be appreciated, conduit assembly 10 is particularly suited for use as an aviation fuel tank electrical conduit assembly since the non-conductive interior of flexible tube 12 prohibits electrical arcing from a worn wire 25 through the tube 12 and into a fuel tank ullage. When installed in a fuel tank, fitting 18 is adapted to be secured to the fuel tank such that at least a portion of the conduit assembly 10 is received within the interior of the fuel tank and a bore of the flexible convoluted tube 12 is provided in communication with the exterior of the fuel tank. Since conduit assembly 10 is sealed, there is no internal leakage of fuel into the assembly, which could compromise operation of electrical wire 25. Furthermore, the materials used in conduit assembly 10 (e.g., PTFE, hard-coat anodized aluminum and stainless steel) are compatible with various aviation hydrocarbon fuels and aircraft operating temperatures, allowing conduit assembly 10 to operate in an aviation fuel tank without failure.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A conduit assembly, comprising:
   a flexible convoluted tube including a non-conductive fluoropolymer interior and a conductive carbon exterior that decreases the electrical resistance of the tube; and
   a fitting secured to an end of the flexible convoluted tube, the fitting including a nipple having a profiled tubular portion received into the end of the flexible convoluted tube and a socket secured to the fitting so as trap the end of the flexible convoluted tube between the nipple and the socket, at least one of the nipple and the socket being made from a metal treated to decrease the electrical resistance of the fitting.

2. The conduit assembly of claim 1, wherein the fluoropolymer interior is PTFE, FEP, PFA, ETFE, ECTFE, MFA, PVDF or THV.

3. The conduit assembly of claim 1, wherein an electrical resistance of the flexible convoluted tube exterior does not exceed approximately 50 Meg-Ohms when measured from end to end.

4. The conduit assembly of claim 1, wherein an electrical resistance of the conduit assembly is generally equal to or greater than about 50 Meg-Ohms with a potential of approximately 1000 volts DC when measured from end to end.

5. The conduit assembly of claim 1, wherein the carbon exterior includes carbon black.

6. The conduit assembly of claim 1, wherein the non-conductive fluoropolymer is impregnated with the conductive carbon.

7. The conduit assembly of claim 1, wherein the socket is made from passivated stainless steel.

8. The conduit assembly of claim 1, wherein the nipple is made from hard-coat anodized aluminum.

9. The conduit assembly of claim 1, wherein the conduit assembly is chemically resistant to hydrocarbon fuel.

10. The conduit assembly of claim 1, further including at least one electrical wire extending through a bore of the flexible convoluted tube.

11. An electrical conduit assembly, comprising:
    a flexible convoluted tube including a non-conductive polymeric interior and a static dissipative or conductive exterior that decreases the electrical resistance of the tube;

a fitting secured to an end of the flexible convoluted tube, the fitting including a nipple having a tubular portion received into the end of the flexible convoluted tube and a socket secured to the fitting so as to trap the end of the flexible convoluted tube between the nipple and the socket, at least one of the nipple and the socket being made from a material that decreases the electrical resistance of the fitting; and at least one electrical wire extending through a bore of the flexible convoluted tube.

12. The electrical conduit assembly of claim 11, wherein the non-conductive polymeric interior is a fluoropolymer and the conductive exterior includes carbon black.

13. The electrical conduit assembly of claim 12, wherein the non-conductive fluoropolymer is impregnated with the conductive carbon black.

14. The electrical conduit assembly of claim 11, wherein the socket is made from passivated stainless steel.

15. The electrical conduit assembly of claim 11, wherein the nipple is made from hard-coat anodized aluminum.

16. An electrical conduit assembly adapted to be installed in a fuel tank having an interior and an exterior, comprising:
    a flexible convoluted tube including a non-conductive polymeric interior and a static dissipative or conductive exterior that decreases the electrical resistance of the tube;
    a fitting secured to an end of the flexible convoluted tube and adapted to be attached to the fuel tank such that at least a portion of the conduit assembly is received within the interior of the fuel tank and a bore of the flexible convoluted tube is provided in communication with the exterior of the fuel tank, the fitting including a nipple having a tubular portion that is received into the end of the flexible convoluted tube and a socket secured to the fitting so as trap the end of the flexible convoluted tube between the nipple and the socket, at least one of the nipple and the socket being made from a material that decreases the electrical resistance of the fitting; and
    at least one electrical wire extending through a bore of the flexible convoluted tube.

17. The electrical conduit assembly of claim 16, wherein the non-conductive polymeric interior is a fluoropolymer and the conductive exterior is carbon black.

18. The conduit assembly of claim 16, wherein the socket is made from passivated stainless steel.

19. The conduit assembly of claim 16, wherein the nipple is made from hard-coat anodized aluminum.

* * * * *